United States Patent
Nakamura et al.

(10) Patent No.: US 9,596,307 B2
(45) Date of Patent: Mar. 14, 2017

(54) COMMUNICATION SYSTEM

(71) Applicant: FUJITSU TEN LIMITED, Kobe-shi, Hyogo (JP)

(72) Inventors: Masashi Nakamura, Kobe (JP); Tadashi Ujino, Kobe (JP); Masanobu Maeda, Kobe (JP); Yohei Yokota, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/790,700

(22) Filed: Jul. 2, 2015

(65) Prior Publication Data

US 2016/0014833 A1    Jan. 14, 2016

(30) Foreign Application Priority Data

Jul. 11, 2014 (JP) .................. 2014-142856

(51) Int. Cl.
| | |
|---|---|
| *H04W 76/02* | (2009.01) |
| *H04L 29/08* | (2006.01) |
| *H04W 12/04* | (2009.01) |
| *H04W 76/04* | (2009.01) |
| *H04W 88/04* | (2009.01) |

(52) U.S. Cl.
CPC ............. *H04W 67/12* (2013.01); *H04W 12/04* (2013.01); *H04W 76/04* (2013.01); *H04W 88/04* (2013.01)

(58) Field of Classification Search
CPC ....................................................... H04B 1/03
See application file for complete search history.

(56) References Cited

U.S. PATENT DOCUMENTS

| | | | |
|---|---|---|---|
| 7,889,713 B2 * | 2/2011 | Zheng ............... | H04L 45/00 370/328 |
| 2003/0202524 A1 * | 10/2003 | Conner .............. | H04L 45/20 370/408 |

(Continued)

FOREIGN PATENT DOCUMENTS

| | | |
|---|---|---|
| JP | 2009-506603 A | 2/2009 |
| JP | 2013-229897 A | 11/2013 |

*Primary Examiner* — Bobbak Safaipour
(74) *Attorney, Agent, or Firm* — Oliff PLC

(57) ABSTRACT

A communication system includes: a plurality of mobile terminals; and a linked apparatus that works in concert with the plurality of mobile terminals. The linked apparatus is configured to establish a wireless connection to a selected one of the plurality of mobile terminals. The selected one of the plurality of mobile terminals is designated as a relaying apparatus that relays communications. The plurality of mobile terminals includes: a first mobile terminal that serves as the relaying apparatus before a change of selection of the relaying apparatus; and a second mobile terminal that serves as the relaying apparatus after the change of selection of the relaying apparatus. In a case where the selection of the relaying apparatus is changed from the first mobile terminal to the second mobile terminal, (1) the first mobile terminal sends, to the linked apparatus, a credential that is used to establish a wireless connection to the second mobile terminal, the credential being acquired from the second mobile terminal, and (2) the linked apparatus establishes the wireless connection to the second mobile terminal as the relaying apparatus using the credential.

17 Claims, 7 Drawing Sheets

(56) References Cited

U.S. PATENT DOCUMENTS

| | | | |
|---|---|---|---|
| 2007/0280172 A1* | 12/2007 | Tan | H04B 7/2606 370/335 |
| 2008/0095163 A1* | 4/2008 | Chen | H04L 45/16 370/392 |
| 2009/0207778 A1* | 8/2009 | Wang | H04B 7/026 370/315 |
| 2013/0051309 A1* | 2/2013 | Van Phan | H04B 7/15592 370/315 |
| 2014/0128068 A1* | 5/2014 | Klein | H04W 84/005 455/435.1 |
| 2015/0156676 A1* | 6/2015 | Yoon | H04B 7/14 370/315 |
| 2015/0350859 A1* | 12/2015 | Hiben | H04W 4/22 455/404.1 |

\* cited by examiner

COMMUNICATION SYSTEM

BACKGROUND OF THE INVENTION

Field of the Invention

The invention relates to a communication technology that uses a relaying apparatus.

Description of the Background Art

Recently, an apparatus (e.g. amplifier) (hereinafter referred to as "linked apparatus") is linked to another device, apparatus, etc. and the linked apparatus that controls sound output to a cabin of a vehicle includes a function of wireless communication with a mobile terminal, such as a smartphone. Moreover, a protocol for the wireless communication is defined according to the mobile terminal. Examples of the protocol are Wi-Fi (trademark) and Bluetooth (trademark). A wireless connection between the mobile terminal and the linked apparatus is established via such a protocol, and then the mobile terminal and the linked apparatus work in concert.

The mobile terminal establishes the wireless connections to the linked apparatus and also to a different mobile terminal. When the mobile terminal being wirelessly connected to the linked apparatus is wirelessly connected also to the different mobile terminal, the mobile terminal serves as a relaying apparatus and thus the different mobile terminal becomes capable of working in concert with the linked apparatus.

As described above, one mobile terminal wirelessly connected to the linked apparatus serves the relaying apparatus and the different mobile terminal wirelessly connected to the relaying apparatus is an apparatus (hereinafter referred to as "relayed apparatus") that communicates with the linked apparatus via the relaying apparatus. Thus, the relaying apparatus and the relayed apparatus work in concert with the linked apparatus to execute various functions. For example, the linked apparatus executes a networked audio function for reproducing audio data included in the relaying apparatus and the relayed apparatus.

However, a user needs to perform operations, as shown below, to change selection of the relaying apparatus. The user checks (1) a SSID (service set identifier) that is identification information of a mobile terminal to be served as a relaying apparatus after the change and (2) a password that is a part of credentials. Then, the user manually enters the password to the linked apparatus and the other mobile terminals included in the system, to establish wireless connections between the relaying apparatus after the change and the linked apparatus and the other mobile terminals (relayed apparatus). Such operations are very complicated for the user and may decrease convenience of the user.

SUMMARY OF THE INVENTION

According to one aspect of the invention, a communication system includes: a plurality of mobile terminals; and a linked apparatus that works in concert with the plurality of mobile terminals. The linked apparatus is configured to establish a wireless connection to a selected one of the plurality of mobile terminals. The selected one of the plurality of mobile terminals is designated as a relaying apparatus that relays communications. The plurality of mobile terminals includes: a first mobile terminal that serves as the relaying apparatus before a change of selection of the relaying apparatus; and a second mobile terminal that serves as the relaying apparatus after the change of selection of the relaying apparatus. In a case where the selection of the relaying apparatus is changed from the first mobile terminal to the second mobile terminal, (1) the first mobile terminal sends, to the linked apparatus, a credential that is used to establish a wireless connection to the second mobile terminal, the credential being acquired from the second mobile terminal, and (2) the linked apparatus establishes the wireless connection to the second mobile terminal as the relaying apparatus using the credential.

The selection of the relaying apparatus can be changed easily without load of a user.

According to another aspect of the invention, the plurality of mobile terminals further includes a third mobile terminal that is different from the first mobile terminal and the second mobile terminal. The third mobile terminal works in concert with the linked apparatus via the relaying apparatus, by establishing a wireless connection to the relaying apparatus. In a case where the selection of the relaying apparatus is changed from the first mobile terminal to the second mobile terminal, (1) the first mobile terminal sends, to the third mobile terminal, the credential acquired from the second mobile terminal, and (2) the third mobile terminal establishes a wireless connection to the second mobile terminal, using the credential.

The third mobile terminal can establish the wireless connection to a new relaying apparatus after the change of the selection of the relaying apparatus without load of the user.

Therefore, an object of the invention is easy change of selection of a relaying apparatus.

These and other objects, features, aspects and advantages of the invention will become more apparent from the following detailed description of the invention when taken in conjunction with the accompanying drawings.

DESCRIPTION OF THE EMBODIMENTS

With reference to the drawings, embodiments of the invention will be hereinafter described.

1. CONFIGURATION

<1-1. Outline of System>

Figure 1:
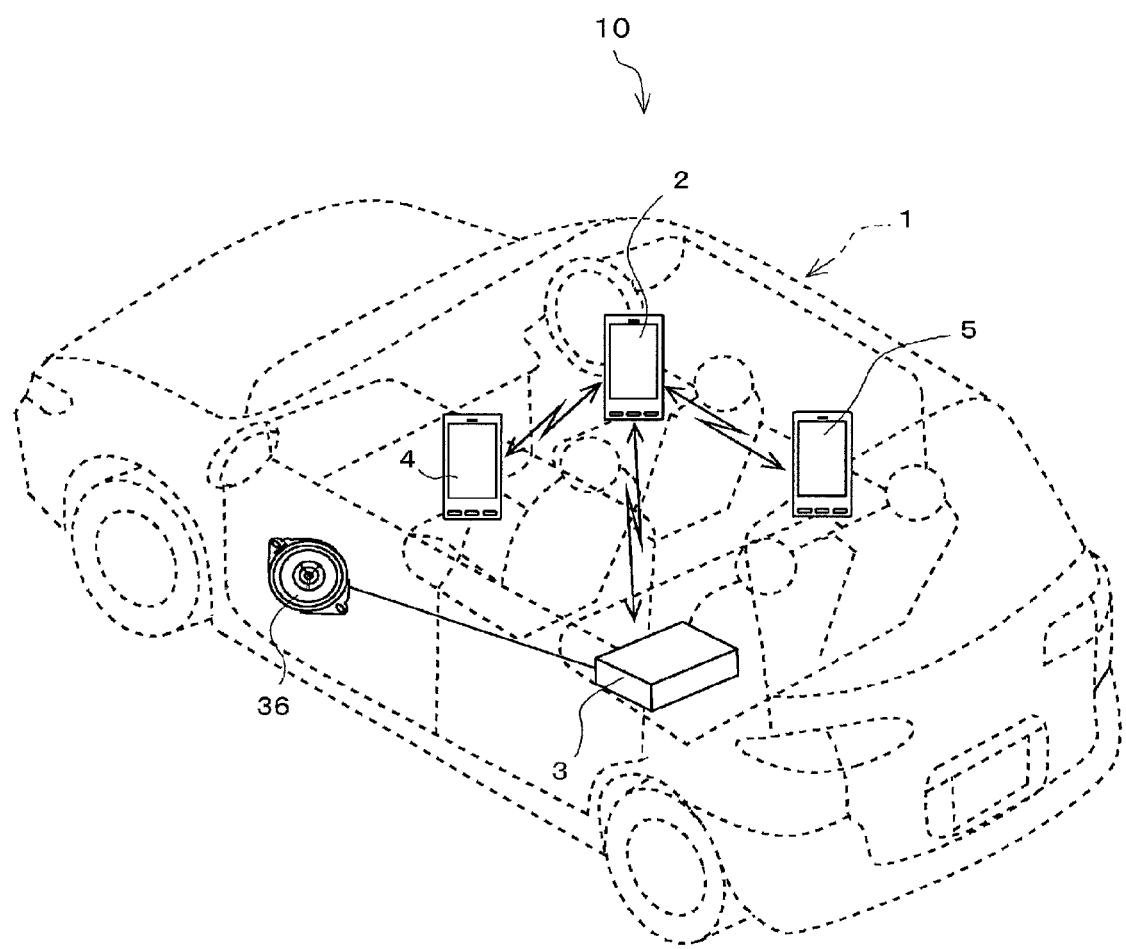
FIG. 1 illustrates an outline of a communication system in this embodiment.

FIG. 1 illustrates an outline of a communication system 10 in this embodiment. The communication system 10 includes a plurality of mobile terminals 2, 4 and 5 that are carried into a cabin of a vehicle 1, a linked apparatus 3 provided in the cabin of the vehicle 1 and speakers 36 electrically connected to the linked apparatus 3.

The plurality of the mobile terminals 2, 4 and 5 are portable electronic devices, such as smartphones, tablet devices, mobile phones and personal digital assistants (PDA), which are carried by users in the cabin.

The linked apparatus 3 is an electronic device that is provided in the cabin of the vehicle 1. The linked apparatus 3 works in concert with the mobile terminals 2, 4 and 5, such as smartphones. The linked apparatus 3 is an amplifier, a display audio or another device that acquires audio data from the mobile terminals 2, 4 and 5 and then causes the speakers 36 to output sound based on the acquired audio data.

In a case of the communication system 10, among the plurality of the mobile terminals, one mobile terminal (e.g. the mobile terminal 2) connected to the linked apparatus 3 serves as a relaying apparatus between the other mobile terminals and the linked apparatus 3. The relaying apparatus works in concert with the linked apparatus 3. The other mobile terminals (e.g. the mobile terminals 4 and 5) are connected, as relayed apparatuses, to the relaying apparatus that relays information, data, etc. to the relaying apparatus. The relayed apparatuses work in concert with the linked apparatus 3 via relay by the relaying apparatus. Thus, the linked apparatus 3 works in concert both with the relaying apparatus and the relayed apparatuses. As described above, in the communication system 10, since the relaying apparatus functions as a hub that relays information, data, etc. between the linked apparatus 3 and the relayed apparatuses, devices included in the communication system 10 communicate wirelessly with one another. Every one of the mobile terminals 2, 4 and 5 in the communication system 10 are capable of functioning as a relaying apparatus. A mobile terminal that functions as the relaying apparatus is not fixed and the relaying apparatus is selected from amongst the plurality of the mobile terminals 2, 4 and 5 included in the communication system 10. Moreover, in a case where a predetermined change condition is satisfied, the selection of the relaying apparatus is changed from a mobile terminal to another.

In the communication system 10, for example, a networked audio function is implemented. Since the devices included in the communication system 10 wirelessly communicate with one another, music lists in the devices are shared within the communication system 10, by the networked audio function. Thus, titles and the like of the music in all the mobile terminals on a network can be displayed on displays of the mobile terminals. For example, in a case where the linked apparatus 3 receives a command to play back music included in one relayed apparatus (e.g. the mobile terminal 4), the linked apparatus 3 sends a music playback command signal to the relayed apparatus via the relay by the relaying apparatus (e.g. the mobile terminal 2). Then, once receiving the music playback command signal, the relayed apparatus sends audio data of the music to the linked apparatus 3 via the relay by the relaying apparatus. The linked apparatus 3 decodes the audio data received from the relayed apparatus and sends to the speakers 36 audio signals acquired through the decoding. As a result, the music in the relayed apparatus (e.g. the mobile terminal 4) is output from the speakers 36.

<1-2. Configuration of Mobile Terminal>

Next, configurations of the plurality of the mobile terminals 2, 4 and 5 included in the communication system 10 will be described.

Figure 2:
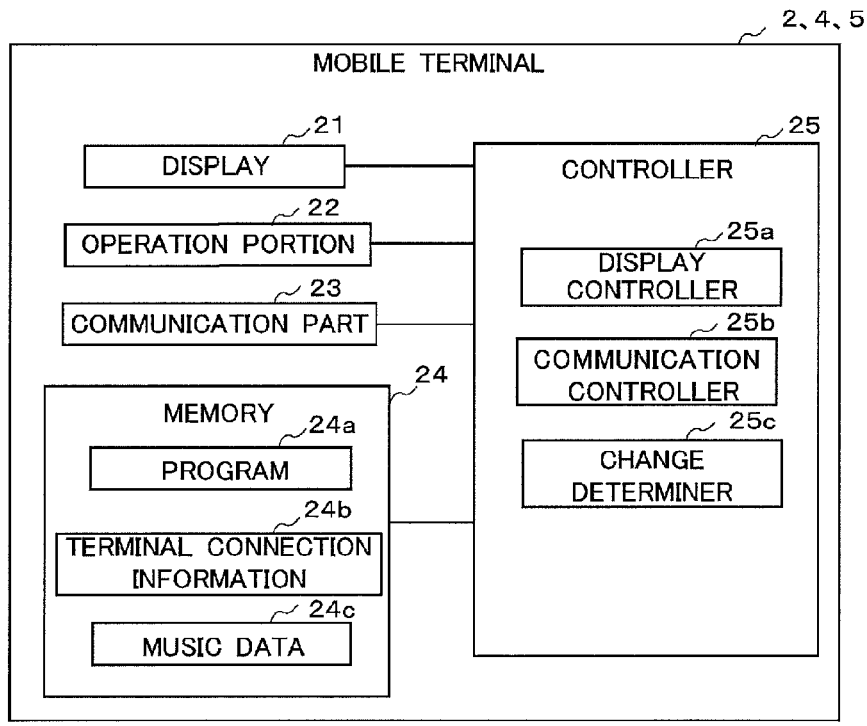
FIG. 2 illustrates a block diagram showing a configuration of a mobile terminal.

FIG. 2 illustrates a block diagram showing the configurations of the mobile terminals 2, 4 and 5. Since the configurations of the mobile terminals 2, 4 and 5 are similar to one another, the configuration of the mobile terminal 2 will be described below as a representative example. The mobile terminal 2 mainly includes a display 21, an operation portion 22, a communication part 23, a memory 24 and a controller 25.

The display 21 displays images and the like to be used for operations of various functions of the mobile terminal 2. For example, a liquid crystal display, an organic EL display or the like is used for the display 21.

The operation portion 22 is an information input apparatus that includes a mechanical button and a touch panel. The user makes operations with the operation portion 22 to execute the various functions of the mobile terminal 2.

The communication part 23 is a wireless LAN communication device standardized by a Wi-Fi (trademark) protocol, such as IEEE802.11a, 802.11b, 802.11g, 802.11n, 802.11ac, or is a BT communication device standardized by a Bluetooth (trademark) protocol, such as IEEE802.15.1. In the explanation below, a Wi-Fi (trademark) protocol is used for the wireless communication between the mobile terminal 2, the linked apparatus 3 and the like.

The memory 24 is a non-volatile semiconductor memory to/from which electrical data can be written and read and which does not lose the data even after power is turned off. For example, an electrical erasable programmable read-only memory (EEPROM) or a flash memory may be used as the memory 24. However, another type of memory may be used. For example, a hard disk drive including a magnetic disk may be configured as the memory 24.

The memory 24 stores: various programs 24a that are used for calculation; terminal connection information 24b that includes a SSID and a password of the mobile terminal 2; and music data 24c.

The programs 24a are read out by the controller 25 and the controller 25 executes the programs 24a for control.

The terminal connection information 24b is used to establish a wireless connection to the mobile terminal 2. The terminal connection information 24b includes the SSID that is identification information specific to the mobile terminal 2, and the password that is a part of credentials corresponding to the SSID of the mobile terminal 2.

The music data 24c includes data of a music list including titles of plural music in the mobile terminal 2 and acoustic data corresponding to the plural music in the music list. In a case where a wireless connection is established between the mobile terminal 2 and another mobile terminal (e.g. the mobile terminal 4 and hereinafter referred to as "different mobile terminal") in the communication system 10 and where the networked audio function of both the mobile terminals is ON, the music list in the mobile terminal 2 can be sent to the different mobile terminal and vice versa. In other words, the music lists in the plural mobile terminals are shared among the plural mobile terminals of which networked audio function is ON and of which the wireless connections to the mobile terminal 2 is established.

The controller 25 is a computer that controls each portion of the mobile terminal 2. The controller 25 is connected to the display 21, the operation portion 22, the communication part 23, the memory 24, etc. included in the mobile terminal 2 and controls the portions of the mobile terminal 2 or the entire mobile terminal 2, based on the program 24a stored in the memory 24.

The controller 25 mainly includes a display controller 25a, a communication controller 25b and a change determiner 25c as main control functions. Functions of the display controller 25a, the communication controller 25b and the change determiner 25c are implemented by execution of the programs 24a.

The display controller 25a generates images that is displayed on the display 21 of the mobile terminal 2 and causes the generated images to be displayed on the display 21. The display controller 25a displays, for example, an image for establishing a wireless connection between the mobile terminal 2 and the linked apparatus 3.

The communication controller 25b performs control to establish the wireless connections to other devices in the communication system 10, such as the linked apparatus 3 and the mobile terminal 4, via the wireless communication using the communication part 23. Thus, the mobile terminal 2 and those devices work in concert. Moreover, the communication controller 25b disconnects the mobile terminal 2 from those devices. Thus, the mobile terminal 2 stops working in concert with those devices.

The change determiner 25c determines whether or not a predetermined change condition for changing the selection of the relaying apparatus is satisfied. Such change conditions and a relaying apparatus selection change process will be described later.

<1-3. Configuration of Linked Apparatus>

Figure 3:
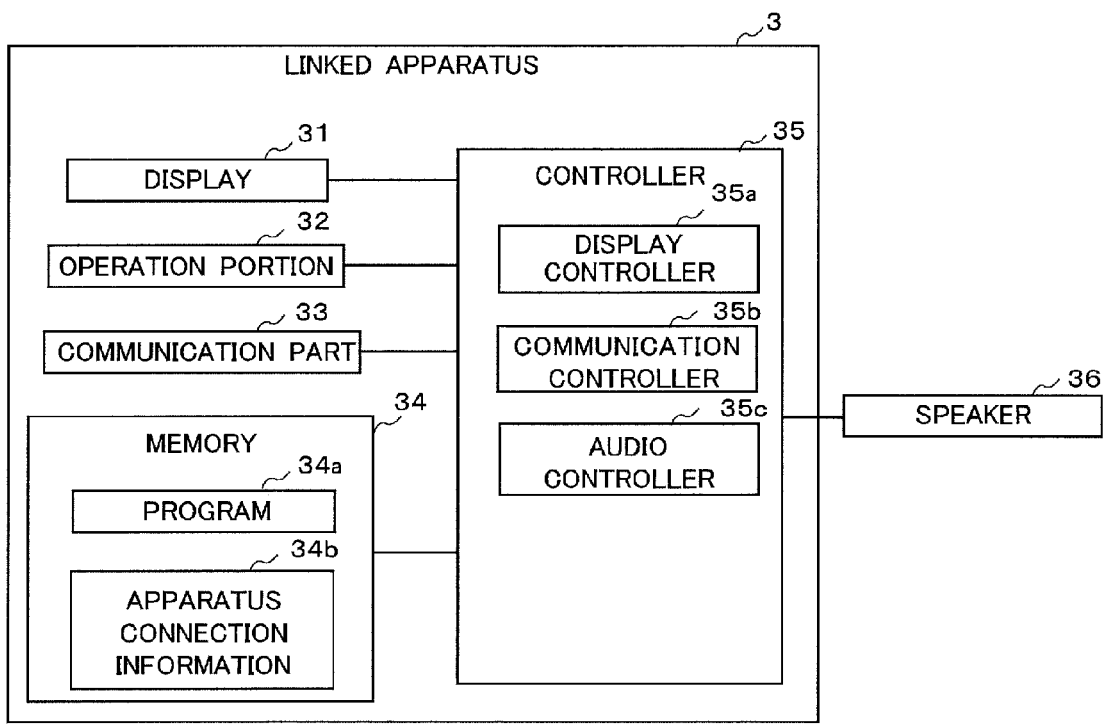
FIG. 3 illustrates a block diagram showing a configuration of a linked apparatus.

Next, a configuration of the linked apparatus 3 will be described. FIG. 3 illustrates a block diagram showing the configuration of the linked apparatus 3. The linked apparatus 3 mainly includes a display 31, an operation portion 32, a communication part 33, a memory 34 and a controller 35. The linked apparatus 3 is provided, for example, under a seat of the cabin of the vehicle 1. The linked apparatus 3 is electrically connected to the speakers 36. The speakers 36 are provided, for example, on both right and left sides of an instrument panel in the cabin and on both right and left front doors of the vehicle 1.

The display 31 displays images and the like to be used for operations of various functions of the linked apparatus 3. For example, a liquid crystal display, an organic EL display or the like is used for the display 31.

The operation portion 32 is an information input apparatus that includes a mechanical button and a touch panel. The user makes operations with the operation portion 32 to execute the various functions of the linked apparatus 3.

The communication part 33 is a wireless LAN communication device standardized by a Wi-Fi (trademark) protocol, such as IEEE802.11a, 802.11b, 802.11g, 802.11n, 802.11ac, or is a BT communication device standardized by a Bluetooth (trademark) protocol, such as IEEE802.15.1.

The memory 34 is a non-volatile semiconductor memory to/from which electrical data can be written and read and which does not lose the data even after power is turned off. For example, an electrical erasable programmable read-only memory (EEPROM) or a flash memory can be used as the memory 34. However, another type of memory may be used. For example, a hard disk drive including a magnetic disk may be configured as the memory 34.

The memory 34 stores: various programs 34a that are used for calculation; and apparatus connection information 34b that includes a SSID and a password of the linked apparatus 3.

The programs 34a are read out by the controller 35 and the controller 35 executes the programs 34a for control.

The apparatus connection information 34b is used to establish a wireless connection to the linked apparatus 3. The apparatus connection information 34b includes the SSID that is identification information specific to the linked apparatus 3, and a password that is a part of credentials corresponding to the SSID of the linked apparatus 3.

The controller 35 is a computer that controls each portion of the linked apparatus 3. The controller 35 is connected to the display 31, the operation portion 32, the communication part 33, the memory 34, etc. included in the linked apparatus 3 and controls the portions of the linked apparatus 3 or the entire linked apparatus 3, based on the program 34a stored in the memory 34.

The controller 35 mainly includes a display controller 35a, a communication controller 35b and an audio controller 35c as main control functions. Functions of the display controller 35a, the communication controller 35b and the audio controller 35c are implemented by execution of the programs 34a.

The display controller 35a generates images that is displayed on the display 31 of the linked apparatus 3 and causes the generated images to be displayed on the display 31. The display controller 35a displays, for example, an image for establishing the wireless connection between the mobile terminal 2 and the linked apparatus 3.

The communication controller 35b performs control to establish the wireless connections to other devices in the communication system 10 via the wireless communication using the communication part 33. Thus, the linked apparatus 3 and those devices work in concert. Moreover, the communication controller 35b disconnects the linked apparatus 3 from those devices. Thus, the linked apparatus 3 stops working in concert with those devices.

The audio controller 35c adjusts amplitude and the like of audio signals acquired by decoding the audio data received from the mobile terminal 2 and then causes the speakers 36 to output sound. Since the sound is output from the speakers 36, in other words, the audio controller 35c controls the speakers 36 to output the sound. The speakers 36 are outputting apparatuses that output sound by control of the audio controller 35c.

2. PROCESS

<2-1. Process for Wireless Connection Establishment>

Figure 4:
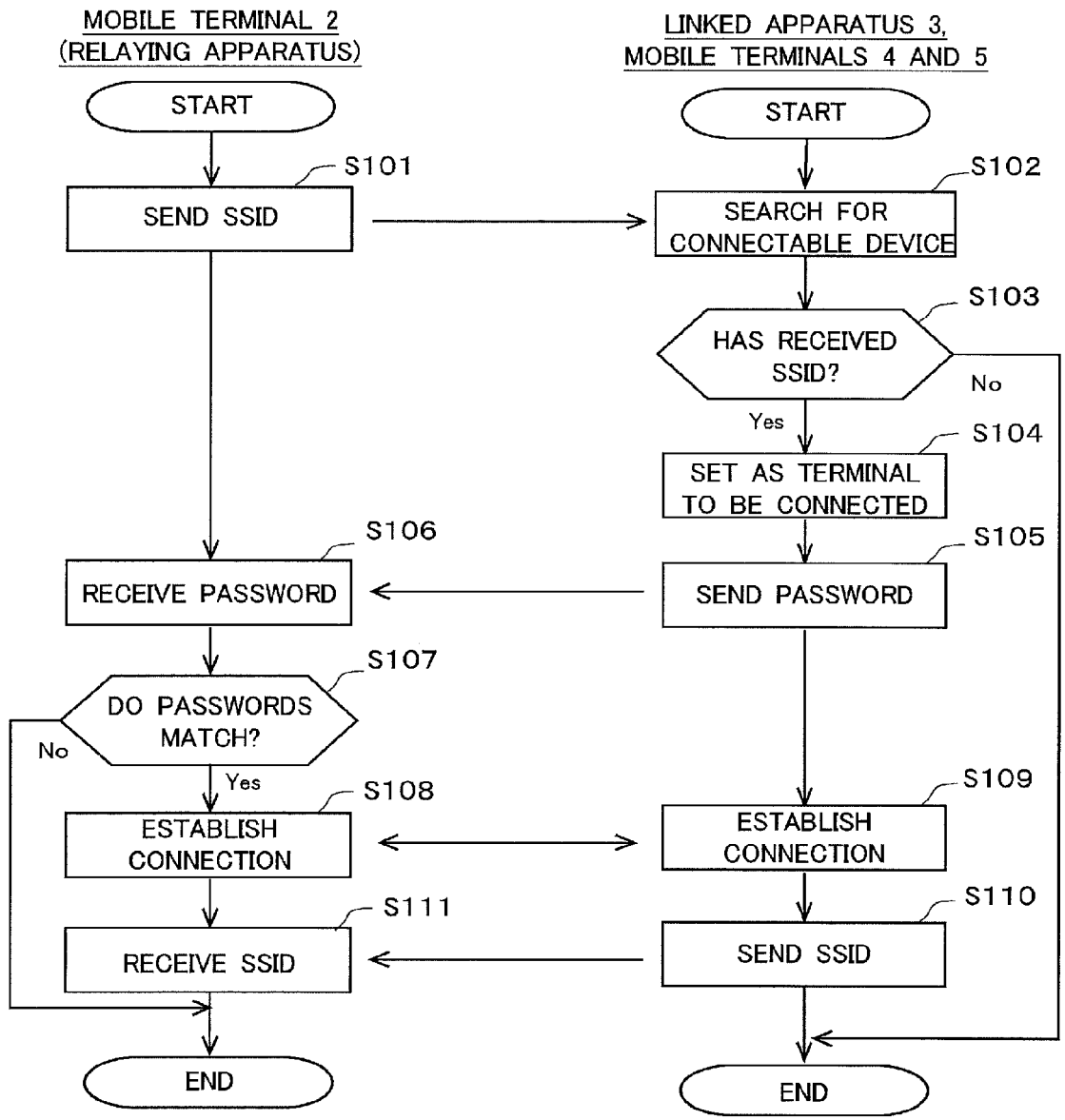
FIG. 4 illustrates establishing wireless connection between devices.

Next described, with reference to FIG. 4, is a process for establishing the wireless connection between devices included in the communication system 10. This is a process for establishing the wireless connections of one mobile terminal (e.g. the mobile terminal 2) to be served as the relaying apparatus to the linked apparatus 3 and the relayed apparatuses (e.g. the mobile terminals 4 and 5). While the devices are being ON, this process is repeated. The explanation below is a case where the wireless connection is to be established between the mobile terminal 2 to be served as the relaying apparatus and the linked apparatus 3.

The mobile terminal 2 sends radio waves including the SSID based on the protocol of the Wi-Fi (trademark) to a predetermined range (e.g. radius of 3 m to 5 m) from a position of the mobile terminal 2 (a step S101). The mobile terminal 2 sends the radio waves having enough power for a mobile terminal in the predetermined range to receive the SSID. A tethering function (Internet sharing function) of the mobile terminal 2 is set to ON to serve as a relaying apparatus after the wireless connections are established between the mobile terminal 2 and the other devices in the communication system 10. On the other hand, a tethering function of the linked apparatus 3 is set to OFF.

While the mobile terminal 2 is sending the SSID to the predetermined range, once the linked apparatus 3 executes a search process for searching for a connectable device/ apparatus based on the Wi-Fi (trademark) protocol (a step S102), the linked apparatus 3 receives the SSID of the mobile terminal 2 (Yes in a step S103). In that state, a user of the linked apparatus 3 selects the SSID of the mobile terminal 2 and enters the password corresponding to the SSID with the operation portion 32. Thus, the mobile terminal 2 is set as a terminal to be connected to the linked apparatus 3 (a step S104) and the password is sent from the linked apparatus 3 to the mobile terminal 2 (a step S105).

In the step S103, in a case where the linked apparatus 3 does not receive the SSID of the mobile terminal 2, the search process for searching for a connectable device/apparatus continues. In a case where the linked apparatus 3 does not receive the SSID during a predetermined time period of the search process (No in the step S103), the search process ends.

Once receiving the password sent from the linked apparatus 3 in the step S105 (a step S106), the mobile terminal 2 determines whether or not the received password matches the password of the mobile terminal 2 (a step S107). In a case where the received password matches the password of the mobile terminal 2 (Yes in the step S107), the wireless connection is established between the mobile terminal 2 and the linked apparatus 3 (steps S108 and S109).

The linked apparatus 3 sends the SSID of the linked apparatus 3 to the mobile terminal 2 serving as the relaying apparatus (a step S110), and the mobile terminal 2 receives the SSID of the linked apparatus 3 (a step S111). In a case where the selection of the relaying apparatus is changed, as described later, the SSID is used as a SSID of a possible next relaying apparatus.

In a case where the received password does not match the password of the mobile terminal 2 (No in the step S107), the mobile terminal 2 sends to the linked apparatus 3 information and the like indicative of mismatching of those passwords, and a process for requesting the user to enter a password again. In a case where a password is not entered within a predetermined time period or in a case where mismatched passwords are entered plural times, the process ends.

Moreover, in addition to the linked apparatus 3, the mobile terminal 4 and the mobile terminal 5 also establish wireless connections to the mobile terminal 2 in the similar process described above with reference to FIG. 4. As a result, the mobile terminal 2 serves as the relaying apparatus that connect the plural devices (the linked apparatus 3 and the mobile terminals 4 and 5). After establishment of the wireless connections of the mobile terminal 4 and the mobile terminal 5, the relayed apparatuses, to the mobile terminal 2 serving as the relaying apparatus, the music lists in those mobile terminals are shared and the communication system 10 works as the networked audio system.

<2-2. Relaying Apparatus Selection Change Process>

Figure 5:
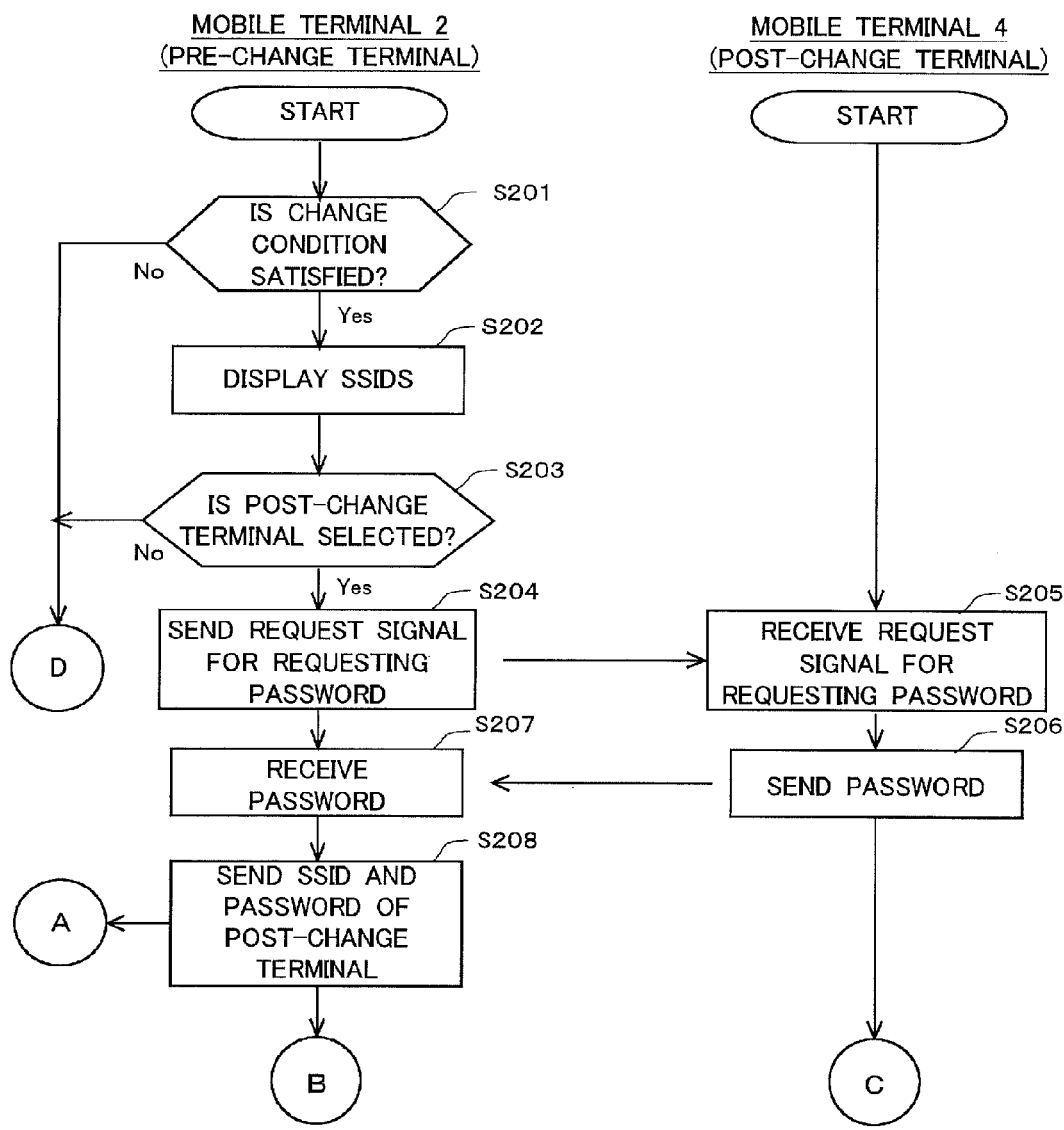
FIG. 5 illustrates a relaying apparatus selection change process.
Figure 6:
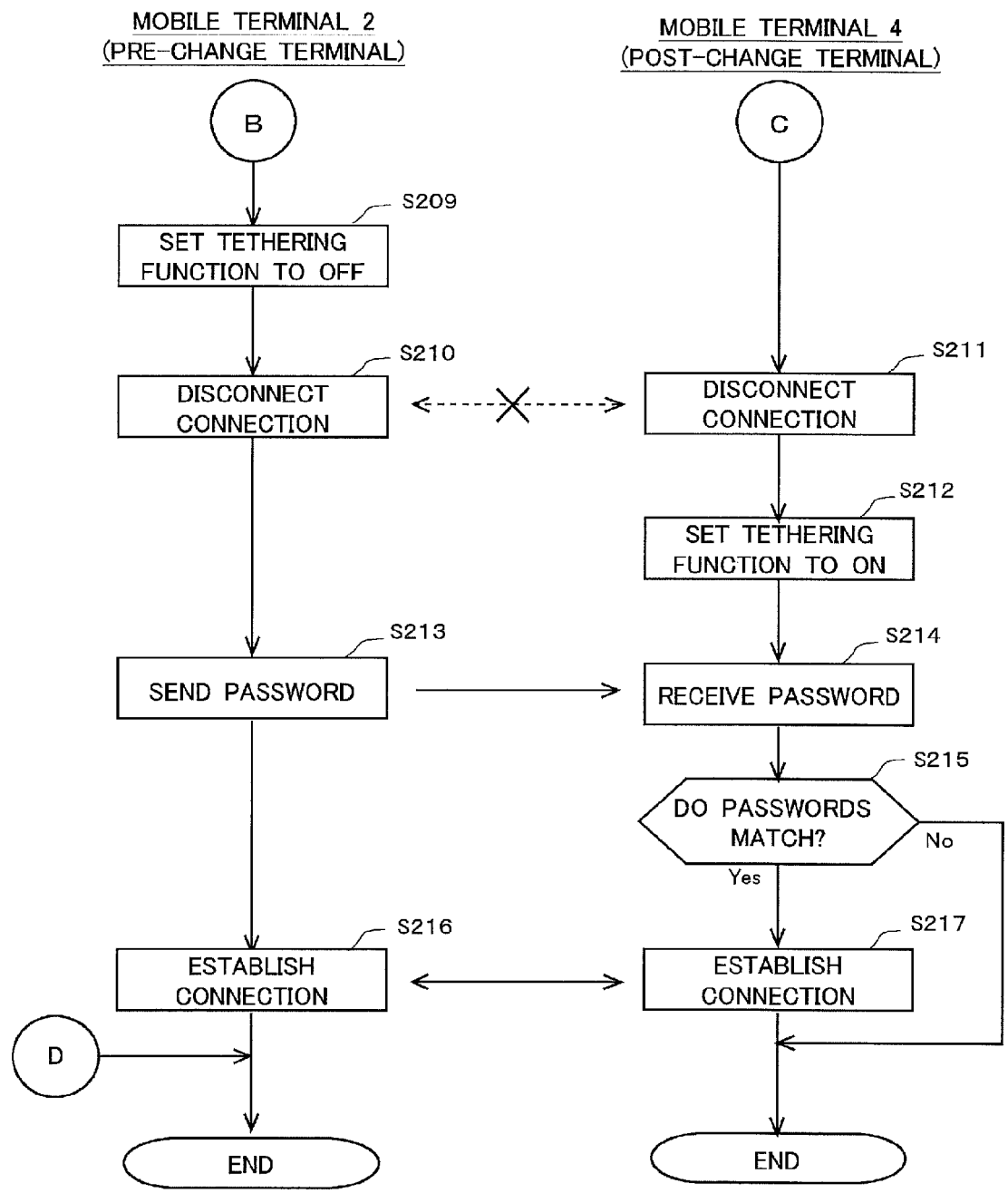
FIG. 6 illustrates the relaying apparatus selection change process.
Figure 7:
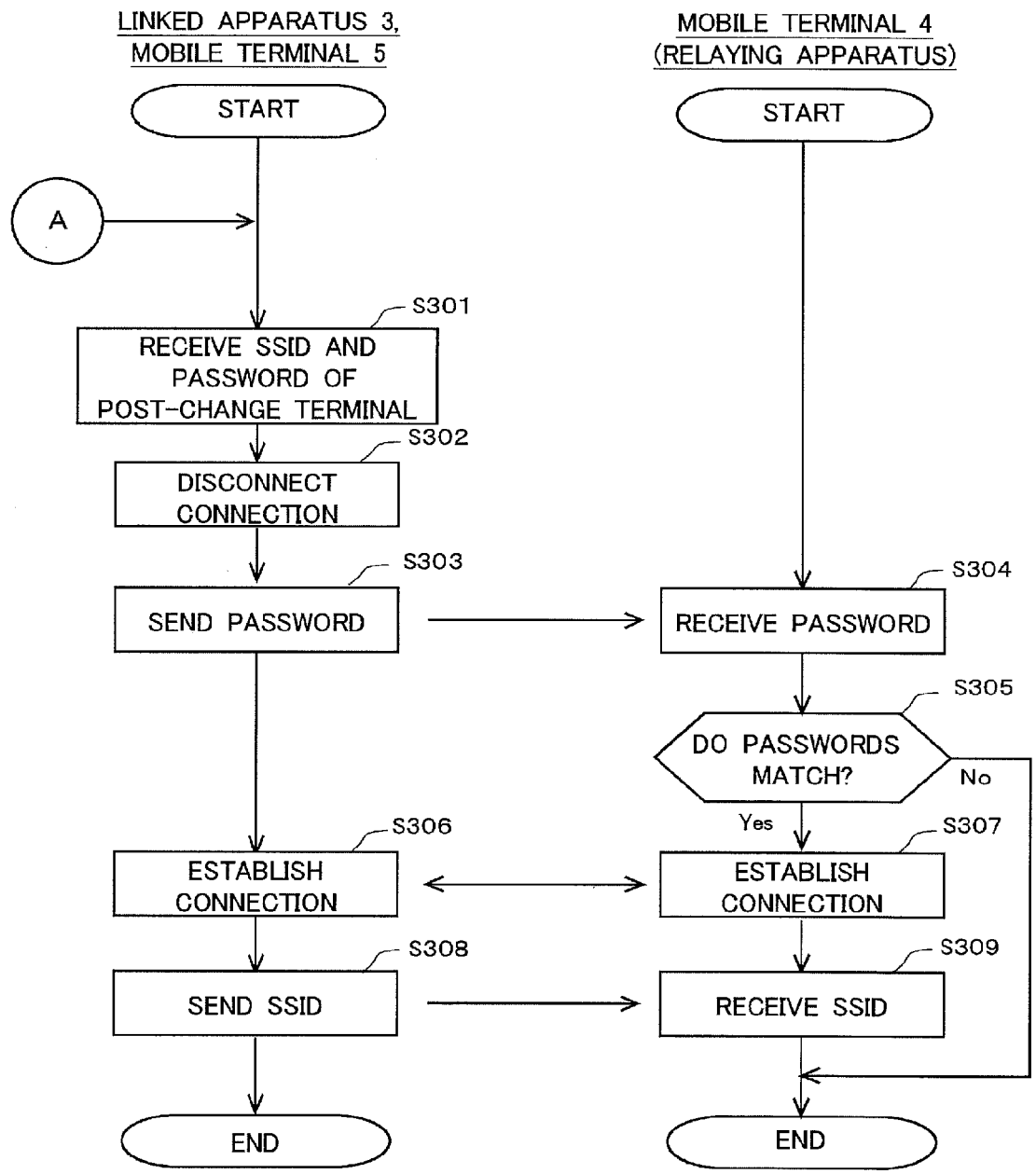
FIG. 7 illustrates the relaying apparatus selection change process.

Next described, with reference to FIGS. 5 to 7, is the relaying apparatus selection change process of the communication system 10. This process is repeated while the relaying apparatus, the relayed apparatuses and the linked apparatus 3 are being ON. For example, when a user carrying the relaying apparatus goes out of the cabin of the vehicle 1, there is a case where the relaying apparatus is out of a communication range of communication with the linked apparatus, etc. Thus, it is impossible for the linked apparatus 3 and the relayed apparatuses to work in concert via the relaying apparatus. Therefore, in order to avoid a situation where the work in concert is impossible, before the relaying apparatus is moved out of the communication range, the relaying apparatus is changed. Moreover, a mobile terminal serving as a relaying apparatus consumes relatively greater battery power than the relayed apparatuses. Therefore, in order to prevent a particular mobile terminal from consuming battery power, the relaying apparatus is changed. Change conditions for changing the selection of a relaying apparatus for such a reason will be described later.

The explanation will be described below as an example where the selection of the relaying apparatus is changed from the mobile terminal 2 currently serving as a relaying apparatus, to the mobile terminal 4 that will serve as the relaying apparatus after the change of the selection. In the explanation below, a mobile terminal serving as the relaying apparatus before the change of the selection is referred to as "pre-change terminal" and a mobile terminal that will serve as the relaying apparatus after the change of the selection is referred to as "post-change terminal." In a process shown in FIG. 5, first, it is determined whether or not the mobile terminal 2 currently serving as the relaying apparatus (the pre-change terminal) satisfies the change condition for changing the selection of the relaying apparatus. In a case where the change condition is satisfied (Yes in a step S201), the mobile terminal 2 displays, on the display 21, SSIDs of the relayed apparatuses acquired from the relayed apparatus beforehand as choices for the post-change terminal (a step S202).

Once the mobile terminal 4 is selected as the post-change terminal from amongst the SSIDs displayed on the display 21 (Yes in a step S203), a request signal for requesting a password corresponding to the SSID of the mobile terminal 4, is sent to the chosen mobile terminal 4 (a step S204).

Once the mobile terminal 4 receives the request signal from the mobile terminal 2 (a step S205), the mobile terminal 4 sends to the mobile terminal 2 the password corresponding to the SSID of the mobile terminal 4 (a step S206). Then, the mobile terminal 2 receives the password sent from the mobile terminal 4 (a step S207). Thus, the mobile terminal 2 that is the pre-change terminal acquires credentials of the mobile terminal 4 that is the post-change terminal. Then, the mobile terminal 2 sends the SSID and the password of the mobile terminal 4 to the mobile terminal 5 and the linked apparatus 3, except the mobile terminal 4 of which the wireless connection to the mobile terminal 2 is established (a step S208). In other words, the pre-change terminal sends the credentials of the post-change terminal both to the mobile terminal 5 and the linked apparatus 3.

Then, once sending the SSID and the password of the mobile terminal 4, the mobile terminal 2 sets the tethering function to OFF (a step S209 shown in FIG. 6). By setting the tethering function to OFF, the wireless connections of the mobile terminal 2 to the mobile terminals 4 and 5 are disconnected (steps S210 and S211). In other words, the mobile terminal 2 deactivates the function as the relaying apparatus that relays communication between the linked apparatus 3 and the mobile terminals 4 and 5.

Once the wireless connection of the mobile terminal 4, the post-change terminal, to the mobile terminal 2 is disconnected, the mobile terminal 4 sets the tethering function to ON (a step S212). Thus, the mobile terminal 4 activates the function as the relaying apparatus.

In order to establish a wireless connection to the mobile terminal 4 serving as a new relaying apparatus, the mobile terminal 2 that ends working as the relaying apparatus sends the SSID and the password of the mobile terminal 4 to the mobile terminal 4 (a step S213).

Once receiving the password sent from the mobile terminal 2 (a step S214), the mobile terminal 4 determines whether or not the received password matches the password of the mobile terminal 4 (a step S215). In a case where the received password matches the password of the mobile terminal 4 (Yes in the step S215), the wireless connection is established between the mobile terminal 4 and the mobile terminal 2 (steps S216 and S217).

In a case where the received password does not match the password of the mobile terminal 4 (No in the step S215), the mobile terminal 4 sends to the mobile terminal 2 information and the like indicative of mismatching of those passwords, and a process for requesting the user to enter a password again. In a case where a password is not entered within a predetermined time period or in a case where mismatched passwords are entered plural times, the process ends.

The mobile terminal 2 does not need to send the SSID of the mobile terminal 2 to the mobile terminal 4 serving as the new relaying apparatus because the mobile terminal 4 has acquired the SSID of the mobile terminal 2 serving as the relaying apparatus before.

As described above, due to the change of the relaying apparatus to the mobile terminal 4, the linked apparatus 3 and the mobile terminal 5 performs a process to continuously work in concert with the other devices in the communication system 10. FIG. 7 illustrates the process performed by the linked apparatus 3 and the mobile terminal 5 in such a case. The process performed by the linked apparatus 3 and the process performed by the mobile terminal 5 are substantially same. Therefore, the process performed by the linked apparatus 3 is described as a representative example.

In the step S208 in FIG. 5, the linked apparatus 3 receives, from the mobile terminal 2 serving as the pre-change terminal, the SSID and the password of the mobile terminal 4 that is the post-change terminal (a step S301). Moreover, once the mobile terminal 2 sets the tethering function to OFF in the step S209 in FIG. 6, the wireless connection of the linked apparatus 3 to the mobile terminal 2 is disconnected (a step 302).

Once the wireless connection to the mobile terminal 2 is disconnected, in order to establish a wireless connection to the mobile terminal 4 serving as the new relaying apparatus, the linked apparatus 3 uses the password of the mobile terminal 4 sent from the mobile terminal 2. In other words, the linked apparatus 3 sends the password corresponding to the SSID of the mobile terminal 4, to the mobile terminal 4 (a step S303).

The mobile terminal 4 receives the password sent from the linked apparatus 3 (a step S304), and then determines whether or not the received password matches the password of the mobile terminal 4 (a step S305). In a case where the received password matches the password of the mobile terminal 4 (Yes in the step S305), the wireless connection is established between the mobile terminal 4 and the linked apparatus 3 (steps S306 and S307).

In a case where the received password does not match the password of the mobile terminal 4 (No in the step 306), the mobile terminal 4 sends to the linked apparatus 3 information and the like indicative of mismatching of those passwords, and the process for requesting the user to enter a password again. In a case where a password is not entered within the predetermined time period or in a case where mismatched passwords are entered plural times, the process ends.

Then, the linked apparatus 3 sends the SSID of the linked apparatus 3 to the mobile terminal 4, the new relaying apparatus, (a step S308), and the mobile terminal 4 receives the SSID of the linked apparatus 3 (a step S309). In a case where the selection of the relaying apparatus is changed from the mobile terminal 4, the SSID is used as a SSID for a possible next relaying apparatus.

A process similar to the process shown in FIG. 7 is performed by the mobile terminal 5 that is not the pre-change terminal or the post-change terminal. In other words, the mobile terminal 5 receives the password of the mobile terminal 4 from the mobile terminal 2 and establishes a wireless connection to the mobile terminal 4 serving as the new relaying apparatus, using the received password of the mobile terminal 4. Thus, the linked apparatus 3 and the mobile terminal 5 work in concert via relay by the mobile terminal 4 serving as the relaying apparatus.

Figure 8:
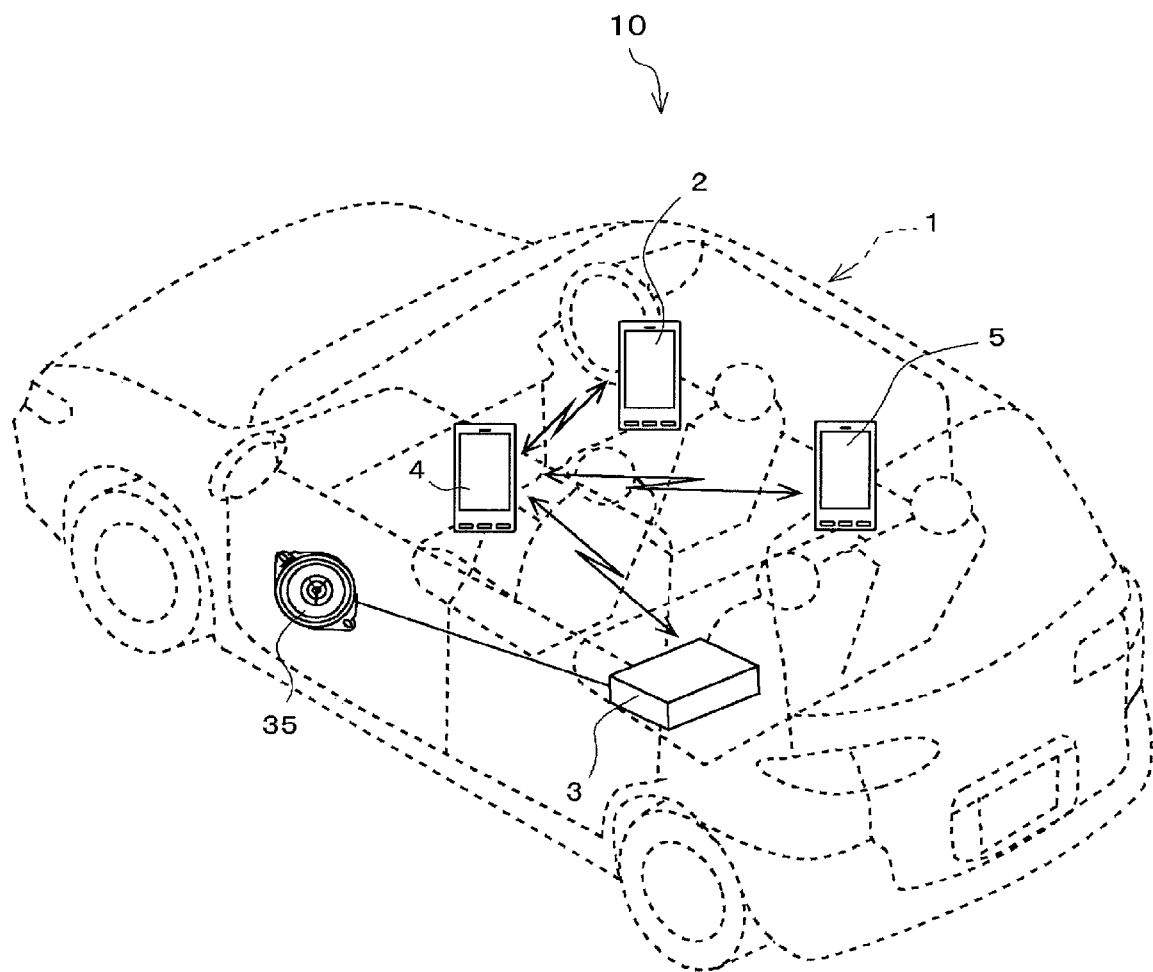
FIG. 8 illustrates a connection state after a change of selection of a relaying apparatus.

FIG. 8 illustrates a connection state after the change of the selection of the relaying apparatus from the mobile terminal 2 to the mobile terminal 4 of the communication system 10. The mobile terminal 2 is the relaying apparatus in FIG. 1. However, the mobile terminal 4 is the relaying apparatus in FIG. 8. The wireless connection of the mobile terminal 4 to the linked apparatus 3 is established. Also, the wireless connections of the mobile terminal 4 are established to the mobile terminal 2, the previous relaying apparatus, and to the mobile terminal 5, the previous relayed apparatus of the mobile terminal 2. These mobile terminal 2 and mobile terminal 5 are relayed apparatuses of the mobile terminal 4 serving as the new relaying apparatus. As a result, the mobile terminal 2 and the mobile terminal 5 that are the relayed apparatuses, work in concert with the linked apparatus 3 via the mobile terminal 4 serving as the relaying apparatus. In other words, the linked apparatus 3 works in concert with the mobile terminal 2 and the mobile terminal 5 via the relay by the mobile terminal 4. The relayed apparatuses and the linked apparatus 3 are wirelessly connected to the relaying apparatus. Therefore, the relaying apparatus may be deemed as "parent device" and the relayed apparatuses and the linked apparatus 3 may be deemed as "dependent device."

<2-3. Relaying Apparatus Selection Change Conditions>

Next concretely described are change conditions for changing the selection of the relaying apparatus (the condition in step S201 in FIG. 5). As examples of the change conditions, six conditions are described below. However, those are merely examples and a different condition may be used. Moreover, any one of those conditions or a set of two or more conditions from those conditions may be used for determination in the step S201. The post-change terminal is selected from amongst the plurality of the terminals 2, 4, and 5, except the pre-change terminal, included in the communication system 10.

A first change condition is a command of the user to change the selection of the relaying apparatus. By a user operation, an application of the pre-change terminal is activated. In a case where a function of changing the selection of the relaying apparatus is executed by the user operation in the activated application, the first change condition is satisfied. Based on the first change condition, the user can change the selection of the relaying apparatus to a desired mobile terminal.

When the user selects an SSID of a mobile terminal from amongst the SSIDs of the candidate post-change terminals, the mobile terminal corresponding to the SSID is selected as the post-change terminal. The selected post-change terminal become a new relaying apparatus and automatically establishes wireless connections to the linked apparatus 3 and the relayed apparatuses.

A second change condition is falling of battery energy left in the pre-change terminal below a predetermined threshold. Based on the second condition, in a case where the battery power left in the pre-change terminal decreases, the selection of the relaying apparatus may be changed to another mobile terminal. Therefore, the plurality of the mobile terminals included in the communication system 10 equally serve as a relaying apparatus that consumes battery power. For example, it is recommended that a mobile terminal having a largest battery power left be selected as the post-change terminal. The selected post-change terminal serves as the new relaying apparatus and automatically establishes the wireless connections to the linked apparatus 3 and the relayed apparatuses.

A third change condition is weakening of a radio wave reception strength of the pre-change terminal below a predetermined threshold. The radio wave reception strength is a reception strength of a radio wave in the wireless communication based on a Wi-Fi (trademark) protocol. For example, in a case where the user carrying the pre-change terminal moves out of the cabin to an outside of the cabin of the vehicle 1, the radio wave reception strength of the pre-change terminal decreases. Based on the third change condition, in a case where the radio wave reception strength of the pre-change terminal is below the predetermined threshold, the selection of the relaying apparatus is changed to another mobile terminal. Therefore, the wireless communication of the communication system 10 can be stable. For example, it is recommended that a mobile terminal having a greatest radio wave reception strength be selected as the post-change terminal. The selected post-change terminal serves as the new relaying apparatus and automatically establishes wireless connections to the linked apparatus 3 and the relayed apparatuses.

A fourth change condition is proximity wireless communication conducted between the pre-change terminal and one (the post-change terminal) of the mobile terminals. Based on the fourth change condition, by bringing a desired mobile terminal into a proximity to the pre-change terminal, the user can cause the desired mobile terminal to serve as the post-change terminal. The user brings the desired mobile terminal into the proximity of a predetermined distance (e.g. 10 cm) or less from the pre-change terminal. The mobile terminal that has conducted the proximity wireless communication with the pre-change terminal is selected as the post-change terminal. The selected post-change terminal serves as a new relaying apparatus and automatically establishes wireless connections to the linked apparatus 3 and the relayed apparatuses.

The proximity wireless communication is conducted by the communication controller 25b (35b) controlling the communication part 23 (33). A communication method of the proximity wireless communication is, for example, a method based on a standard communication protocol of near field communication (NFC). The communication method is for near field communication within a relatively short distance of, for example, 10 cm.

A fifth change condition is proximity wireless communication conducted between the linked apparatus 3 and one (the post-change terminal) of the mobile terminals. Based on the fifth change condition, if the user does not know a mobile terminal serving as the relaying apparatus, by bringing a desired mobile terminal into a proximity to the linked apparatus 3, the user can cause the desired mobile terminal to serve as the post-change terminal. The mobile terminal that has conducted the proximity wireless communication with the linked apparatus 3 is selected as the post-change terminal. The selected post-change terminal serves as a new relaying apparatus and automatically establishes wireless connections to the linked apparatus 3 and the relayed apparatuses.

A sixth change condition is passing of a predetermined time period from establishment of a wireless connection between the pre-change terminal and a mobile terminal (the relayed apparatus) other than the pre-change terminal. Based on the sixth change condition, the plurality of the mobile terminals included in the communication system 10 equally serve as a relaying apparatus. Thus, consumption levels of battery power of the plurality of the mobile terminals are substantially equalized. For example, an order of serving as the relaying apparatus is determined beforehand for the plurality of the mobile terminals included in the communication system 10. Then, the post-change terminal is selected based on the order from amongst the plurality of the mobile terminals. The selected post-change terminal serves as the relaying apparatus and automatically establishes wireless connections to the linked apparatus 3 and the relayed apparatuses.

3. SUMMARY

As described above, the communication system 10 in this embodiment includes the plurality of the mobile terminals 2, 4 and 5, and the linked apparatus 3. The relaying apparatus is selected from amongst the plurality of the mobile terminals 2, 4 and 5. The linked apparatus 3 establishes a wireless connection to the relaying apparatus (e.g. the mobile terminal 2) and the mobile terminals (e.g. the mobile terminals 4 and 5) other than the relaying apparatus also establish wireless connections to the relaying apparatus. In such a state where the wireless connections are established, the linked apparatus 3 works in concert with the mobile terminals other than the relaying apparatus through which communications are relayed between the linked apparatus 3 and the other mobile terminals. In a case where a predetermined change condition for changing the selection of the relaying apparatus is satisfied, the pre-change terminal acquires, from the post-change terminal, the credentials that are used to establish the wireless connections to the post-change terminal. Then, after sending the credentials of the post-change terminal to the linked apparatus 3 and the mobile terminals other than the post-change terminal, the pre-change terminal changes: the tethering function thereof from ON to OFF; disconnects the wireless connections; and deactivates the function as the relaying apparatus.

After the disconnection from the pre-change terminal, the post-change terminal changes the tethering function thereof from OFF to ON and activates the function as the relaying apparatus. The linked apparatus 3 and the other mobile terminals send to the post-change terminal the credentials of the post-change terminal. As a result, the linked apparatus 3 and the other mobile terminals establish wireless connections to the post-change terminal (a new relaying apparatus). After that, the linked apparatus 3 and the other mobile terminals (the relayed apparatuses) work in concert via relay by the relaying apparatus. Therefore, the selection of the relaying apparatus can be changed easily without load of the user. Moreover, the linked apparatus 3 and the other mobile terminals establish the wireless connections to the new relaying apparatus without load of the user.

Change conditions for changing the selection of the relaying apparatuses are, for example, user command made to the pre-change terminal, battery power left in the pre-change terminal, radio wave strength of the pre-change terminal, proximity communication between the pre-change terminal and the post-change terminal, proximity communication between the linked apparatus 3 and the post-change terminal, and passing of a predetermined time period from establishment of connections between the pre-change terminal and the relayed apparatuses.

4. MODIFICATIONS

The embodiment of the invention is described above. However, the invention is not limited to the foregoing embodiment and various modifications are possible. Such modifications are described below. Any of all forms in the foregoing embodiment and modifications below may be combined arbitrarily with one another.

In the foregoing embodiment, the communication system 10 includes three mobile terminals and one linked apparatus. However, a communication system 10 may include more mobile terminals and linked apparatuses or less mobile terminals. Concretely, the communication system 10 may include two or four or more mobile terminals and two or more liked apparatuses.

In the foregoing embodiment, the mobile terminals 2, 4 and 5 are smartphones and the like. On the other hand, mobile terminals 2, 4 and 5 may be file servers that are used with a direct connection to a computer network, such as network attached storage (NAS).

In the foregoing embodiment, the linked apparatus 3 includes the display 31, and in a case where the linked apparatus 3 establishes a wireless connection to the relaying apparatus, the password corresponding to the SSID of the relaying apparatus is entered with the operation portion 32 of the relaying apparatus, and the password displayed on the display 31 is sent to the relaying apparatus. However, a linked apparatus 3 may not include the display 31. In that case, the linked apparatus 3 establishes the wireless connection to the relaying apparatus based on a method using Wi-Fi Protected Setup (WPS). An example of the method using the WPS is the push-button method where a wireless connection is established by simultaneous operations with the operation portion 32 of the linked apparatus 3 and with an operation portion of the relaying apparatus.

In the foregoing embodiment, the user command described as the first change condition is made to an application in the pre-change terminal. On the other hand, a user command may be made with an operation portion, such as a hard switch on a steering wheel and the like, provided to the vehicle 1. In this case, in response to the user operation, a command signal indicative of change of selection of a relaying apparatus is sent to a linked apparatus 3. Then, the linked apparatus 3 sends the command signal to the pre-change terminal and then the relaying apparatus selection change process is performed.

In the foregoing embodiment, the six conditions are described as the change conditions for changing the selection of the relaying apparatus. In a case where at least one of the change conditions is satisfied, a mobile terminal having largest music data (number of music titles) stored in the memory 24 may be selected as the post-change terminal.

In the foregoing embodiment, Wi-Fi (trademark) is used for the wireless communication. However, a wireless communication method other than the Wi-Fi (trademark) wireless communication may be used as long as the object of the invention in the embodiment is achieved.

In the foregoing embodiment, each of the relayed apparatuses and the linked apparatus 3 establishes a wireless connection to the relaying apparatus. However, an order of establishing the wireless connections to the relaying apparatus by the relayed apparatuses and the linked apparatus 3 is not especially specified. Prior to the linked apparatus 3, the relayed apparatuses may establish the wireless connections to the relaying apparatus, or prior to the relayed apparatus, the linked apparatus 3 may establish the wireless connection to the relaying apparatus.

In the foregoing embodiment, sending and receiving of the credentials are described. For example, the foregoing embodiment describes that the linked apparatus 3 sends the password of the mobile terminal 2 in the step S105 and that the mobile terminal 2 receives the password of the mobile terminal 2 in the step S106 in FIG. 4. On the other hand, in a case where a mobile terminal 2 does not receive the credentials from a linked apparatus 3, the process may end. Moreover, once receiving the credentials from the linked apparatus 3, the mobile terminal 2 may let the linked apparatus 3 know about the receipt of the credentials. In a case where the linked apparatus 3 receives information of the receipt, the process may be continued. In a case where, after sending the credentials to the mobile terminal 2, the linked apparatus 3 does not receive the information of the receipt of the credentials from the mobile terminal 2, the linked apparatus 3 may send the credentials to the mobile terminal 2 plural times. In a case where the linked apparatus 3 does not receive the information of the receipt from the mobile terminal 2 after sending the credentials to the mobile terminal 2 plural times, the linked apparatus 3 may end process.

In the foregoing embodiment, the various functions are implemented by software by the CPU performing the calculation process in accordance with the program. However, a part of those functions may be implemented by an electric hardware circuit. Moreover, in the foregoing embodiment, a part of functions that are implemented by a hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A communication system comprising:
a plurality of mobile terminals; and
a linked apparatus that includes a controller and works in concert with the plurality of mobile terminals to relay communications, the linked apparatus being configured to establish a direct wireless connection to a selected one of the plurality of mobile terminals, the selected one of the plurality of mobile terminals being designated as a relaying apparatus, wherein
the plurality of mobile terminals includes:
   a first mobile terminal that includes a controller and serves as the relaying apparatus before a change of selection of the relaying apparatus; and
   a second mobile terminal that includes a controller and serves as the relaying apparatus after the change of selection of the relaying apparatus, and
in a case where the selection of the relaying apparatus is changed from the first mobile terminal to the second mobile terminal, (1) the controller of the first mobile terminal causes the first mobile terminal to send, to the linked apparatus, a credential that is used to establish a direct wireless connection to the second mobile terminal, the credential being acquired by the first mobile terminal from the second mobile terminal, and (2) the controller of the linked apparatus causes the linked apparatus to establish the direct wireless connection to the second mobile terminal as the relaying apparatus using the credential.

2. The communication system according to claim 1, wherein
the plurality of mobile terminals further includes a third mobile terminal that is different from the first mobile terminal and the second mobile terminal,
the third mobile terminal includes a controller and works in concert with the linked apparatus via the relaying apparatus, by establishing a direct wireless connection to the relaying apparatus, and
in a case where the selection of the relaying apparatus is changed from the first mobile terminal to the second mobile terminal, (1) the controller of the first mobile terminal causes the first mobile terminal to send, to the third mobile terminal, the credential acquired from the second mobile terminal, and (2) the controller of the third mobile terminal causes the third mobile terminal to establish a direct wireless connection to the second mobile terminal, using the credential.

3. The communication system according to claim 1, wherein
in a case where a predetermined change condition is satisfied, the selection of the relaying apparatus is changed.

4. The communication system according to claim 3, wherein
the predetermined change condition is a command from a user to change the selection of the relaying apparatus.

5. The communication system according to claim 3, wherein
the predetermined change condition is falling of battery energy left in the first mobile terminal below a predetermined threshold.

6. The communication system according to claim 3, wherein
the predetermined change condition is weakening of a radio wave reception strength of the first mobile terminal below a predetermined threshold.

7. The communication system according to claim 3, wherein
the predetermined change condition is proximity between the first mobile terminal and the second mobile terminal.

8. The communication system according to claim 3, wherein
the predetermined change condition is proximity between the linked apparatus and the second mobile terminal.

9. The communication system according to claim 3, wherein
the predetermined change condition is passing of a predetermined time period from establishment of a wireless connection between the first mobile terminal and another one of the mobile terminals.

10. A communication system comprising:
a plurality of mobile terminals; and
a linked apparatus that works in concert with the plurality of mobile terminals, the linked apparatus being configured to establish a direct wireless connection to a selected one of the plurality of mobile terminals, the selected one of the plurality of mobile terminals being designated as a relaying apparatus that relays communications to the linked apparatus from the other mobile terminals, wherein:
the plurality of mobile terminals includes a first mobile terminal that serves as the relaying apparatus before a change of selection of the relaying apparatus, and a second mobile terminal that serves as the relaying apparatus after the change of selection of the relaying apparatus;
the first mobile terminal includes a controller configured to acquire a credential from the second mobile terminal without manual user input of the credential and send the credential to the linked apparatus when the relaying apparatus is to be changed from the first mobile terminal to the second mobile terminal;
the credential is used to establish a direct wireless connection between the linked apparatus and the second mobile terminal; and
the linked apparatus includes a controller that is configured to automatically establish the direct wireless connection to the second mobile terminal as the relaying apparatus using the credential.

11. The communication system according to claim 10, wherein the linked apparatus is configured to control sound output to a cabin of a vehicle.

12. The communication system according to claim 10, wherein the relaying apparatus is to be changed from the first mobile terminal to the second mobile terminal when commanded from a user to change the selection of the relaying apparatus.

13. The communication system according to claim 10, wherein the relaying apparatus is to be changed from the first mobile terminal to the second mobile terminal when the battery power left in the first mobile terminal falls below a predetermined threshold.

14. The communication system according to claim 10, wherein the relaying apparatus is to be changed from the first mobile terminal to the second mobile terminal when the reception strength of the first mobile terminal with the linked apparatus falls below a predetermined threshold.

15. The communication system according to claim 10, wherein the relaying apparatus is to be changed from the first mobile terminal to the second mobile terminal due to a change in proximity between the first and second mobile terminals.

16. The communication system according to claim 10, wherein the relaying apparatus is to be changed from the first mobile terminal to the second mobile terminal when the second mobile terminal becomes more proximate to the linked apparatus than the first mobile terminal.

17. The communication system according to claim 10, wherein the relaying apparatus is to be changed from the first mobile terminal to the second mobile terminal when a predetermined time period has passed from establishment of a wireless connection between the first mobile terminal and one of the other mobile terminals.

* * * * *